United States Patent
Grüssel et al.

(10) Patent No.: US 7,959,530 B2
(45) Date of Patent: Jun. 14, 2011

(54) ELASTOMERIC PRODUCT HAVING A RADICAL CROSS-LINKED RUBBER MIXTURE

(75) Inventors: Karl-Friedrich Grüssel, Celle (DE); Reinhard Teves, Seelze (DE); Michael Well, Vechelde (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 970 days.

(21) Appl. No.: 11/485,961

(22) Filed: Jul. 14, 2006

(65) Prior Publication Data

US 2007/0249787 A1   Oct. 25, 2007

(30) Foreign Application Priority Data

Apr. 20, 2006   (DE) .................. 10 2006 018 717

(51) Int. Cl.
- C08F 8/00 (2006.01)
- C08F 210/16 (2006.01)
- F16G 1/00 (2006.01)
- F16G 1/21 (2006.01)

(52) U.S. Cl. ............... 474/237; 525/331.7; 525/360; 525/371; 525/372; 525/373; 525/193; 474/242

(58) Field of Classification Search .................. 474/271
See application file for complete search history.

(56) References Cited

U.S. PATENT DOCUMENTS

| 3,257,352 A | 6/1966 | Ottenheym et al. |
| 3,926,873 A * | 12/1975 | Aishima et al. ................ 525/36 |
| 4,191,671 A * | 3/1980 | Kataoka et al. ................ 524/87 |

FOREIGN PATENT DOCUMENTS

| EP | 0 866 834 | 9/1998 |
| EP | 1 205 515 | 5/2002 |
| EP | 1205515 A1 * | 5/2002 |
| JP | 4339843 | 11/1992 |
| JP | 2005132865 * | 5/2005 |

OTHER PUBLICATIONS

Chisso Corporation, Operating Instructions of Anion Exchange Chromatography Media Cellufine A-200 and A-500 & A-800.*
English translation of japanese patent provided.*
Furukawa et al., Preparation of Active Calcium Carbonate for Reinforcing SBR, Bulletin of the Institute for Chemical Research, Kyoto University, Sep. 20, 1962, 40(4): 211-228).*

* cited by examiner

*Primary Examiner* — David Wu
*Assistant Examiner* — Elizabeth Eng
(74) *Attorney, Agent, or Firm* — Walter Ottesen

(57) ABSTRACT

The invention relates to an elastomeric product which contains a radical cross-linked rubber mixture, especially drive belts. For the production of elastomeric products, especially drive belts, having a long service life and producible in an environmentally friendly way, the rubber mixture contains (a) 0.1 to 50 phr of at least one carboxylic acid, which is at least $\alpha,\beta$ unsaturated and $\gamma,\delta$ unsaturated and preferably has at least one allylic hydrogen atom; and, (b) 0.1 to 50 phr of at least one salt-former as co-activator.

21 Claims, No Drawings

ELASTOMERIC PRODUCT HAVING A RADICAL CROSS-LINKED RUBBER MIXTURE

CROSS REFERENCE TO RELATED APPLICATION

This application claims priority of German patent application no. 10 2006 018 717.2, filed Apr. 20, 2006, the entire content of which is incorporated herein by reference.

FIELD OF THE INVENTION

The invention relates to an elastomeric product which includes a radical cross-linked rubber mixture.

BACKGROUND OF THE INVENTION

Elastomeric products which have to withstand high dynamic loads, such as drive belts, transport belts or flexible tubes, must satisfy high requirements as to wear resistance, modulus of elasticity, tensile strength, tear resistance, aging resistance, flexibility in cold temperatures, heat build-up and chemical and oil resistance. Additional requirements for drive belts include low noise development and retention of desired mechanical characteristics at high temperatures. Overall, the mentioned characteristics should contribute to a long service life of the elastomeric product.

In order to satisfy these high requirements, especially with respect to heat resistance, radical cross-linked, that is, peroxide cross-linked rubber mixtures, are utilized for many elastomeric products, especially for drive belts. These radical cross-linked rubber mixtures are based, for example, on hydrogenated nitrile rubber (HNBR), ethylene-propylene-diene rubber (EPDM) and/or ethylene-propylene rubber (EPM). To increase the cross-linking density and to improve the characteristics of the vulcanized product of radical cross-linked rubber mixtures it is further known to add co-agents/co-activators, such as tri-allyl compounds or reactive acrylate derivates, to the mixture. As co-agents, for example, metal salts of $\alpha,\beta$-unsaturated carboxylic acids are suggested, such as zinc salts of acrylic acid or methacrylic acid.

In European patent publication 0 866 834 B1, for example, drive belts having a long service life are described which are based on EPDM and/or EPM and include 32 to 100 phr of at least one metal salt of an $\alpha,\beta$-unsaturated carboxylic acid, preferably zinc diacrylate.

European patent publication 1 205 515 A1 discloses the use of 1 to 30 phr of at least one metal salt of an $\alpha,\beta$-unsaturated carboxylic acid, especially zinc dimethacrylate, in mixtures of ethylene-alpha-olefin rubber, such as EPDM and EPM.

Japanese patent publication 2981575 B2 discloses drive belts which include a peroxide cross-linked rubber mixture and the rubber mixture is based on a saturated rubber (for example, EPM) and includes staple fibers and a metal salt of an ethylenically unsaturated carboxylic acid. In this publication, it is further described that, in addition to the direct use of the metal salts of the ethylenically unsaturated carboxylic acid, these salts can be generated in situ in that suitable metal salts, such as carbonates, oxides or hydroxides, and the ethylenically unsaturated carboxylic acid are added to the mixture and react there to the corresponding metal salt of an ethylenically unsaturated carboxylic acid.

SUMMARY OF THE INVENTION

It is therefore an object of the invention to provide elastomeric products, especially drive belts, which include a radical cross-linked rubber mixture and are characterized by long service life and environmentally friendly production.

This object is attained according to the invention in that the rubber mixture contains the following:
(a) 0.1 to 50 phr (parts by weight, based on 100 parts by weight of all rubbers in the mixture) of at least one carboxyl group-containing carboxylic acid which is at least $\alpha,\beta$ unsaturated and $\gamma,\delta$ unsaturated; and,
(b) as co-activator, 0.1 to 50 phr of at least one salt-former, a metal-containing compound reactive with such carboxyl groups to form salt bridges therebetween.

The unit phr (parts per hundred parts of rubber by weight) used in this specification is the usual quantity unit for preparing mixtures. The apportionment of the parts by weight of the individual substances is always based on 100 parts by weight of the total mass of all rubbers present in the mixture.

It was found that by providing (a) at least one carboxylic acid, which is at least $\alpha,\beta$ unsaturated and $\gamma,\delta$ unsaturated, and preferably one which has an allylic hydrogen atom on a carbon atom at at least one end of the conjugated double bond system, and (b) at least one metal salt-former in an unvulcanized rubber mixture, which are present in the elastomeric product upon radical cross-linking, an especially high degree of cross-linking can be obtained and therefore a strengthened elastomeric product. This strengthening leads to especially high abrasion resistance.

For the improvement of the degree of cross-linking it appears essential that the carboxylic acid has a system of at least two conjugated double bonds with the system having a carboxylic group which pulls electrons. When the acid has one or more allyl hydrogens, it is believed these become especially active, particularly those in allyl position to the conjugated double bond furthest from a given carboxylic group. In the radical cross-linking, the carboxylic acid appears to be preferably bound in this way directly to the polymer chain and only then reacts with the metal salt-former while forming cross-linkages with the aid of peroxide.

It is important that the specific carboxylic acid and the metal salt-former, when added to the rubber mixture, are in an unreached state. When starting with metal salts of the specific carboxylic acids, the strengthening effect could not be seen, probably because no preliminary reaction of the carboxylic acid with polymer can take place. The use of metal salts of carboxylic acids, which are only ethylenically unsaturated (no conjugated double bonds present), does not lead in all cases to the especially good strengthening because the singly unsaturated carboxylic acids are probably not active enough and are environmentally disadvantageous.

Furthermore, the radical cross-linked rubber mixtures having the specific carboxylic acid and the metal salt-former in the given amounts are distinguished by a reduced compression set, that is, by a reduced creep. This effects an improvement of the performance over the service life in these mixtures because the products show a small change of the surface geometry over the service life.

The radical cross-linked rubber mixtures with the specific carboxylic acid and the metal salts have the additional advantage that they show high dynamic durability so that the elastomeric products having these rubber mixtures withstand well a dynamic long-time use. Furthermore, the rubber mixtures have good strength and stress values.

The rubber mixtures for the elastomeric products of the invention can be mixed without problems because the specific carboxylic acid and the metal salt-former are well dispersable in the rubber matrix.

An especially good improvement in degree of cross-linking can be obtained when the rubber mixture has 10 to 40 phr of at least one carboxylic acid which is at least α,β unsaturated and γ,δ unsaturated and has at least one allylic hydrogen atom at the end of the conjugated double bond system. One individual carboxylic acid can be used. But it is also possible to use several carboxylic acids of this type in the mixture. All carboxylic acids can be used which have at least two conjugated double bonds in α,β and γ,δ positions to a carboxylic group. Therefore, carboxylic acids which have three or more conjugated double bonds can also be used.

According to a preferred embodiment of the invention, the carboxylic acid is, however, a 2,4-hexadienoic acid. Especially preferred is trans,trans-2,4-hexadienoic acid (sorbic acid) which is available in large amounts in the marketplace at low cost and is ecologically safe. It is known for use as a preservative. Sorbic acid can be especially well mixed into the rubber mixture and is well distributed in the mixture and leads to elastomeric products having especially good dynamic characteristics. During incorporation, no irritating or toxic volatile gases are formed so that no special ventilation systems have to be provided for the production of the mixture.

The rubber mixture for the elastomeric product contains 0.1 to 50 phr, preferably 5 to 40 phr of at least one metal salt-former. Several metal salt-formers can also be used in the mixture.

For example, metal hydroxides, metal oxides or metal carbonates can be used as metal salt-formers. Metal oxides and metal carbonates have been shown to be especially effective with respect to the degree of cross-linking and are therefore preferably used.

The metal salt-formers can, for example, contain magnesium, barium, calcium, lithium, sodium, potassium, lead, tin or the like. Preferably, zinc compounds, especially zinc oxide, are used, and these are especially active in cross-linking.

In order to further improve the degree of cross-linking and to obtain especially abrasion resistant and dynamically serviceable elastomeric products, it has been shown to be advantageous to use active zinc oxide. Active zinc oxide has a large specific surface. While standard zinc oxides or "zinkweiss" have BET surface areas of up to 10 m$^2$/g (for example, "zinkweiss HARZSIEGEL®" having a BET surface of about 4.7 m$^2$/g or "zinkweiss Rotsiegel" having a BET surface area of about 4.5 m$^2$/g by the Grillo Company), the BET surface areas in active zinc oxides lie at or above 20 m$^2$/g. Active zinc oxides can be obtained, for example, under the designation "zinc oxide active" from the LANXESS Company (BET surface area of about 45 m$^2$/g) or zinc oxide RAC from the Brüggemann Company (BET surface area of about 69 m$^2$/g). These active zinc oxides are, as a rule, produced by precipitation reaction in solutions, whereas standard zinc oxides are recovered by burning zinc vapors.

The rubber mixture for elastomeric products can be based on various radical cross-linkable rubbers and blends of such rubbers.

Thus, the rubber mixture can, for example, be based on at least one ethylene-alpha-olefin rubber, such as ethylene propylene diene rubber (EPDM) or ethylene-propylene rubber (EPM). These rubber types can be used over a wide temperature range and have good chemical and oil resistance. EPDM and EPM can also be used as blends. Rubber mixtures which are based on at least one ethylene-alpha-olefin rubber are preferably used for frictionally-engaged drive belts such as V-belts or V-ribbed belts.

Optionally, the rubber mixture can also be based on at least one hydrogenated nitrile rubber (HNBR) which has good abrasion resistance, good oil resistance and good low temperature performance. Rubber mixtures which are based on at one hydrogenated nitrile rubber are preferably utilized for form-fitting drive belts such as toothed belts.

Furthermore, the rubber mixture can also include other rubber types, as, for example, silicone rubber, polychloroprene, epichlorohydrin rubber, natural rubber, ethylene-vinylacetate rubber, chlorosulphonated polyethylene, et cetera.

The radical cross-linking of the rubber mixture can take place with common peroxides. For example, the following can be utilized: 2,5-dimethyl-2,5-di-tertiary-butyl-peroxyhexane, di-tertiary-butyl peroxide, tertiary-butyl-perbenzoate, dicumyl-peroxide, α,α'-di-tertiary-butyl-peroxy-diisopropyl benzene.

The rubber mixture can further include loading materials in appropriate amounts. These loading materials are, for example, fillers (such as carbon black, silica and short fibers), softeners and wax, anti-aging agents, stearic acid and bonding agents and others.

The elastomeric products of the invention can be widely differing products which have to withstand dynamic loading and for which good abrasion resistance is desired. These characteristics are required, for example, in transport belts, hoses and fabrics coated with elastomer.

According to a preferred embodiment of the invention, the elastomeric product is, however, a drive belt which includes the radical cross-linked rubber mixture. The drive belts can be produced cost-effectively and environmentally safely and are characterized by a high dynamic load capacity and an increased service life because of reduced abrasion.

The drive belts can be frictionally engaging drive belts, such as flat belts, V-belts or V-ribbed belts. Preferably, the drive belt is a V-ribbed belt in which good abrasion performance is achieved.

If the drive belt is a V-ribbed belt, then the radical cross-linked rubber mixture can form the ribs and/or the back and/or the cord embedding mixture and/or the rubber coating mixture of the V-ribbed belt.

It is also possible that the drive belt is a form-fitting drive belt, preferably a toothed belt. For the toothed belt, the cover layer and the base body including the teeth are preferably formed by the radical cross-linked rubber mixture. Such toothed belts exhibit improved service life because of the improved strength and higher stress values of the cross-linked mixture since the danger of teeth being sheared off is reduced. Improvements in strength and stress values can also be realized at high temperatures.

The elastomeric products of the invention can be produced according to methods known to those working in this art. V-ribbed belts can, for example, be produced by grinding or forming methods and toothed belts can be produced by extrusion processes. The rubber mixture can be mixed according to known methods and, thereafter, can be utilized like a conventional rubber mixture in the production of product blanks. The blanks can then be cross-linked with known vulcanization methods and then brought into the desired form.

DESCRIPTION OF THE PREFERRED EMBODIMENTS OF THE INVENTION

In the following, the invention is described in detail without, however, being limited to these examples.

In the following Tables 1 to 3, comparison and inventive rubber mixtures are shown which can be utilized for the elastomeric products. Table 1 shows rubber mixtures based on EPDM and Table 2 shows rubber mixtures based on EPM. These mixtures can, for example, be utilized for the ribs of V-ribbed belts. Table 3 shows fiber-filled mixtures based on HNBR which can, for example, be utilized for toothed belts. In all mixture examples contained in the tables, the quantity units are parts by weight based on 100 parts by weight of the total rubber (phr). The comparison mixtures are designated "V" while the mixtures of the invention are designated "E". The mixtures in the tables vary with respect to the amounts of sorbic acid, zinc salt-formers and zinc salts used.

The zinc sorbate used in Table 1 was produced by the following method:

224 g sorbic acid were added to 1,000 ml ethanol. While stirring, 117 g basic zinc carbonate was added incrementally at room temperature. The mixture formed a readily stirrable suspension. At room temperature, stirring was continued and, after a short delay, the formation of $CO_2$ started which showed that the reaction was occurring. After 24 hours, enough zinc sorbate had formed so that a firm mass had formed. In a rotary evaporator, the ethanol was drawn off at 60° under vacuum. A white mass of zinc disorbate was recovered and ground in a mill.

Production of the mixture was conducted under conventional conditions. The conversion times to achieve the relative cross-linking stages of 10% ($t_{10}$) and 90% ($t_{90}$) as well as the difference between end thrust force $F_e$ and start thrust force $F_a$ (as a measure of the degree of cross-linking) were determined with a moving disc rheometer (MDR) at 180° C. according to DIN 53 529. From all mixtures, test specimens were produced by vulcanization under pressure at 180° C. (heating times: 10 minutes for Tables 1 and 2, 20 minutes for Table 3) and, with these test specimens, material characteristics typical for the rubber industry are determined which are listed in the tables. For the tests on test specimens, the following test methods were used:

Shore A hardness at room temperature and, if required, at 150° C. according to DIN 53 505;

tensile strength at room temperature and, if required, at 150° C. according to DIN 53 504;

elongation at break at room temperature and, if required, at 150° C. according to DIN 53 504;

stress value at room temperature and, if required, at 150° C. and 100% elongation according to DIN 53 504;

compression set according to DIN 53 517 over 22 hours at 100° C. and with a deformation of 25%;

Tensile strength, elongation at break and stress values were determined in calandered fiber-filled mixtures in directions longitudinal to as well as transverse to the general direction in which the fibers were aligned by calandering.

tear resistance at room temperature according to DIN 53 507 WRY on test specimens of 2 mm thickness;

abrasive wear according to DIN 53 516.

TABLE 1

|  | Unit | 1(V) | 2(V) | 3(E) | 4(V) |
|---|---|---|---|---|---|
| Components |  |  |  |  |  |
| EPM | phr | 100 | 100 | 100 | 100 |
| Carbon Black | phr | 55 | 55 | 55 | 55 |
| Stearic Acid | phr | 1 | 1 | 1 | 1 |
| Softener | phr | 10 | 10 | 10 | 10 |
| Anti-Aging Agent | phr | 2 | 2 | 2 | 2 |
| Peroxide on Carrier[a] | phr | 7 | 7 | 7 | 7 |
| Active Zinc Oxide[b] | phr | 5 | 5 | 10 | 5 |
| Sorbic Acid | phr | — | — | 10 | — |
| Zinc Disorbate | phr | — | — | — | 15 |
| Zinc Dimethacrylate | phr | — | 15 | — | — |

TABLE 1-continued

|  | Unit | 1(V) | 2(V) | 3(E) | 4(V) |
|---|---|---|---|---|---|
| Characteristics |  |  |  |  |  |
| $F_e-F_a$ | dNm | 34.00 | 54.00 | 47.33 | 36.28 |
| $t_{10}$ | min | 0.52 | 0.40 | 0.43 | 0.38 |
| $t_{90}$ | min | 6.67 | 4.50 | 5.43 | 4.85 |
| Hardness | Shore A | 72 | 82 | 80 | 76 |
| Tensile Strength at RT | MPa | 18 | 23 | 22 | 20 |
| Elongation at break at RT | % | 255 | 250 | 221 | 240 |
| Stress Value 100% | MPa | 4 | 9 | 8 | 6 |
| Compression Set | % | 30 | 35 | 20 | 29 |

[a] α,α'-di-tert.-butyl-peroxy-di-isopropyl-benzene, 40 weight-% on an inorganic carrier
[b] active zinc oxide, "Zinkoxid aktiv" from the LANXESS Company, Germany The addition of different cross-linking activators was investigated with the mixtures which are listed in Table 1. The mixture of column 1 contains no sorbic acid, zinc salt-former or zinc salt. The cross-linking is achieved exclusively with the peroxide. A degree of cross-linking of 34 dNm is not sufficient for use in such abrasion resistant products as drive belts.

The mixture of column 2 is cross-linked using 15 phr zinc methylacrylate as is known in the art, for example, from European patent publication 1 205 515 A1. The compression set increases, that is, the mixture tends to creep. This leads, for example, in V-ribbed belts or toothed belts, to a situation wherein the surface geometry of the belts changes and therefore leads to a poorer wear resistance. The mixture of column 4 contains zinc disorbate, which provides little benefit with respect to degree of cross-linking and compression set. A degree of cross-linking of 36.28 dNm is attained which is not significantly different from mixture 1 which contains no metal salts of carboxylic acids. Compared to the latter, only a slight increase in hardness occurs which suggests that the sorbate acted as an inactive fill material.

If now free sorbic acid is used in combination with zinc oxide in a similar mixture (mixture of row 3), then, surprisingly, a very high degree of cross-linking is attained, and that mixture is well adapted for the production of wear-resistant elastomeric products such as drive belts. This is particularly surprising since it appears that the reaction mechanism could not have run via intermediary formation of zinc disorbate. In that case, the attainable results should not have been any better than with the mixture of column 4. The cross-linking mechanism of mixture 4 appears to involve, in substantial degree, binding of sorbic acid to the EPM-molecule ahead of salt-bridge formation. There are different possibilities for this. An EN-type reaction is possible via hydrogen atoms with the chains of the EPM, in the case of a hydrogen abstraction of EPM-molecules, the sorbic acid is also capable of very fast Diels-Alder reactions. The compression set is markedly reduced and thus improves the service life of, for example, belts, because creep and compression set of the mixtures is reduced.

A comparison experiment with free methylacrylic acid and zinc oxide had to be abandoned because the mixture was extremely lacrimatory because of unconverted methylacrylic acid residues and had to be ended abruptly for workplace hygienic reasons. Commercial production of marketable belts in this way is not practical for environmental reasons.

TABLE 2

|  | Unit | 5(E) | 6(E) | 7(E) | 8(E) | 9(E) | 10(E) |
|---|---|---|---|---|---|---|---|
| Components |  |  |  |  |  |  |  |
| EPDM | phr | 100 | 100 | 100 | 100 | 100 | 100 |
| Carbon Black | phr | 55 | 55 | 55 | 55 | 55 | 55 |
| Stearic Acid | phr | 1 | 1 | 1 | 1 | 1 | 1 |
| Softener | phr | 10 | 10 | 10 | 10 | 10 | 10 |
| Anti-aging Agent | phr | 5 | 5 | 5 | 5 | 5 | 5 |
| Peroxide on Carrier[a] | phr | 7 | 7 | 7 | 7 | 7 | 7 |
| Sorbic Acid | phr | 10 | 15 | 5 | 10 | 15 | 15 |
| Active Zinc Oxide[b] | phr | 10 | 10 | — | — | — | — |
| Zinc Oxide Indirect[c] | phr | — | — | 10 | 10 | 10 | — |
| Basic Zinc Carbonate | phr | — | — | — | — | — | 10 |
| Characteristics |  |  |  |  |  |  |  |
| $F_e-F_a$ | dNm | 47.33 | 54.45 | 30.67 | 32.11 | 33.3 | 36.5 |
| $t_{10}$ | min | 0.43 | 0.42 | 0.51 | 0.48 | 0.46 | 0.41 |
| $t_{90}$ | min | 5.43 | 5.18 | 5.68 | 5.83 | 5.08 | 4.7 |
| Hardness | Shore A | 80 | 82 | 73 | 74 | 76 | 79 |
| Tensile Strength at RT | MPa | 22 | 21 | 22 | 22 | 20 | 18.1 |
| Elongation at Break at RT | % | 221 | 175 | 305 | 298 | 283 | 229 |
| Stress Value 100% | MPa | 8 | 11 | 5 | 5 | 6 | 7.9 |
| Tear Resistance | N/mm | 3.7 | 4.6 | 4.1 | 3.8 | 3.8 | 3.9 |
| Abrasion | mm$^3$ | 44 | 51 | 70 | 72 | 78 | 89 |

[a] α,α'-di-tert.-butyl-peroxy-di-isopropyl-benzene, 40 weight-% on inorganic carrier
[b] active zinc oxide, "Zinkoxid aktiv" from the LANXESS Company, Germany
[c] Zinc white HARZSIEGEL ®, Norzinco GmbH Harzer Zinkoxide Table 2 shows experiments with different zinc salt-formers in cooperation with sorbic acid in EPDM-mixtures. The degree of cross-linking increases with increasing amounts of sorbic acid. With active zinc oxide (mixtures 5 and 6) the highest degrees of cross-linking are attained, which results in especially low abrasion. With respect to strength and stress value at elongation, these two mixtures show the highest values. Table 2 also indicates that abrasion resistance runs parallel to the degree of cross-linking.

TABLE 3

|  | Unit | 11 (V) | 12 (E) |
|---|---|---|---|
| Components |  |  |  |
| HNBR[d] | phr | 100 | 100 |
| Carbon Black | phr | 15 | 15 |
| Silica | phr | 15 | 15 |
| Aramid fibers[e] | phr | 3 | 3 |
| Stearic Acid | phr | 1 | 1 |
| Softener | phr | 6 | 6 |
| Anti-Aging Agent | phr | 2.5 | 2.5 |
| Peroxide on Carrier[a] | phr | 7 | 7 |
| Active Zinc Oxide[b] | phr | 6 | 11.6 |
| Sorbic Acid | phr | — | 15.6 |
| Zinc Dimethylacrylate | phr | 18 | — |
| Characteristics |  |  |  |
| $F_e-F_a$ | dNm | 28.83 | 32.19 |
| $t_{10}$ | min | 0.34 | 0.44 |
| $t_{90}$ | min | 7.96 | 7.54 |
| Hardness | Shore A | 82 | 83 |
| Tensile Strength at RT (lengthwise) | MPa | 18.5 | 22.5 |
| Tensile Strength at RT (transverse) | MPa | 16.7 | 19.9 |
| Elongation at break at RT (lengthwise) | % | 399 | 357 |
| Elongation at break at RT (transverse) | % | 344 | 331 |
| Stress Value 100% at RT (lengthwise) | MPa | 8.6 | 9.0 |
| Stress Value 100% at RT (transverse) | MPa | 4.8 | 5.6 |
| Tensile Strength at 150° C. (lengthwise) | MPa | 6.0 | 6.5 |
| Tensile Strength at 150° C. (transverse) | MPa | 5.2 | 6.4 |
| Elongation at break at 150° C. (lengthwise) | % | 194 | 146 |
| Elongation at break at 150° C. (transverse) | % | 186 | 165 |
| Stress Value 100% at 150° C. (lengthwise) | MPa | 4.4 | 5.2 |
| Stress Value 100% at 150° C. (transverse) | MPa | 3.4 | 4.3 |

[a] α,α'-di-tert.-butyl-peroxy-di-isopropyl-benzene, 40 weight-% on inorganic carrier
[b] active zinc oxide, "Zinkoxid aktiv" from the LANXESS Company, Germany
[d] 34% acrylonitrile content, 4% remaining double bonding
[e] p-aramid fibers having an average length of 3 mm, Twaron ®-fibers The mixtures of Table 3 are fiber reinforced mixtures based on HNBR as they are conventionally used for toothed belts. Because of the presence of fibers aligned because of the calandering process, the data obtained from tension testing differs in the longitudinal and transverse directions.

In the transition from mixture 11 to mixture 12, the zinc dimethacrylate was replaced on an equimolar basis for sorbic acid and zinc oxide. Mixture 2 is distinguished by an increased degree of cross-linking.

It is furthermore advantageous that the time to 10% cross-linking ($t_{10}$) is lengthened and the time to 90% cross-linking ($t_{90}$) is shortened. That means that in production processes the mixture has an improved scorch safety while, at the same time, having a shortened total vulcanization time. With respect to product characteristics, the mixture 12 further shows a clear improvement in strength and clearly increased tensile values, and both of these characteristics are also manifested at increased temperatures. These characteristics are especially important in a toothed belt because they counter shearing off of teeth and shortened service life.

It is understood that the foregoing description is that of preferred embodiments of the invention and that various changes and modifications may be made thereto without departing from the spirit and scope of the invention as defined in the appended claims.

What is claimed is:

1. A drive belt which contains a radical cross-linked rubber mixture, wherein the rubber mixture comprises:
    (a) 0.1 to 50 phr (parts by weight, based on 100 parts by weight of all rubbers in the mixture) of at least one carboxyl group-containing carboxylic acid, which is at least $\alpha, \beta$ unsaturated and $\gamma, \delta$ unsaturated; and,
    (b) as co-activator, 0.1 to 50 phr of at least one salt-former, a metal-containing compound reactive with such carboxyl groups to form salt bridges therebetween,
    wherein the rubber mixture contains at least one of an ethylene-propylene-diene rubber (EPDM), ethylene-propylene rubber (EPM) or hydrogenated nitrile rubber.

2. The drive belt of claim 1, wherein the rubber mixture contains 10 to 40 phr of said at least one carboxylic acid.

3. The drive belt of claim 1, wherein said at least one carboxylic acid includes at least one allylic hydrogen.

4. The drive belt of claim 1, wherein said at least one carboxylic acid is a 2,4-hexadiene acid.

5. The drive belt of claim 1, wherein said at least one carboxylic acid is sorbic acid.

6. The drive belt of claim 1, wherein the rubber mixture contains 5 to 40 phr of said at least one salt-former.

7. The drive belt of claim 6, wherein said at least one salt-former is a metal oxide or a metal carbonate.

8. The drive belt of claim 1, wherein said at least one salt-former is a zinc compound.

9. The drive belt of claim 1, wherein said at least one salt-former is zinc oxide.

10. The drive belt of claim 1, wherein the rubber mixture contains ethylene-propylene-diene rubber (EPDM).

11. The drive belt of claim 1, wherein the rubber mixture contains ethylene-propylene rubber (EPM).

12. The drive belt of claim 1, wherein the rubber mixture contains hydrogenated nitrile rubber.

13. The drive belt of claim 1, wherein the drive belt is a friction-tight drive belt.

14. The drive belt of claim 13, wherein the drive belt is a V-ribbed belt.

15. The drive belt of claim 14, wherein the radical cross-linked rubber mixture forms the ribs of the V-ribbed belt.

16. The drive belt of claim 14, wherein the radical cross-linked rubber mixture forms the back of the V-ribbed belt.

17. The drive belt of claim 14, wherein the radical cross-linked rubber mixture forms the cord embedding mixture or a rubberizing mixture of the V-ribbed belt.

18. The drive belt of claim 1, wherein the drive belt is a form-tight drive belt.

19. The drive belt of claim 18, wherein the drive belt is a toothed belt.

20. The drive-belt of claim 19, wherein the radical cross-linked rubber mixture forms the cover layer and the base body comprising the teeth.

21. A drive belt which contains a radical cross-linked rubber mixture, wherein the rubber mixture comprises:
    (a) 0.1 to 50 phr (parts by weight, based on 100 parts by weight of all rubbers in the mixture) of at least one carboxyl group-containing 2,4-hexadiene acid; and,
    (b) as co-activator, 0.1 to 50 phr of at least one salt-former, a zinc-containing compound reactive with such carboxyl groups to form salt bridges therebetween,
    wherein the rubber mixture contains at least one of an ethylene-propylene-diene rubber (EPDM), ethylene-propylene rubber (EPM) or hydrogenated nitrile rubber.

* * * * *